United States Patent
Cordwell et al.

(10) Patent No.: US 9,777,174 B2
(45) Date of Patent: Oct. 3, 2017

(54) PROCESS FOR PREPARING A DISPERSION, DISPERSION, USE AND METHOD

(71) Applicant: Fujifilm Imaging Colorants Limited, Manchester (GB)

(72) Inventors: Richard Cordwell, Manchester (GB); Gordon Ellis, Manchester (GB); Owen Lozman, Manchester (GB); Neil Tallant, Manchester (GB)

(73) Assignee: Fujifilm Imaging Colorants Limited (GB)

( * ) Notice: Subject to any disclaimer, the term of this patent is extended or adjusted under 35 U.S.C. 154(b) by 850 days.

(21) Appl. No.: 14/349,533

(22) PCT Filed: Sep. 26, 2012

(86) PCT No.: PCT/GB2012/052374
§ 371 (c)(1),
(2) Date: Apr. 3, 2014

(87) PCT Pub. No.: WO2013/050740
PCT Pub. Date: Apr. 11, 2013

(65) Prior Publication Data
US 2014/0292940 A1    Oct. 2, 2014

(30) Foreign Application Priority Data
Oct. 6, 2011   (GB) .................................. 1117187.3

(51) Int. Cl.
| | | |
|---|---|---|
| *C09D 11/326* | (2014.01) | |
| *C09B 67/00* | (2006.01) | |
| *B01F 17/00* | (2006.01) | |
| *C09D 11/322* | (2014.01) | |
| *C09B 67/08* | (2006.01) | |
| *C09B 67/46* | (2006.01) | |
| *C09B 67/02* | (2006.01) | |

(52) U.S. Cl.
CPC ............ *C09D 11/326* (2013.01); *B01F 17/00* (2013.01); *C09B 67/009* (2013.01); *C09B 67/0013* (2013.01); *C09B 67/0097* (2013.01); *C09D 11/322* (2013.01)

(58) Field of Classification Search
CPC ................................................. C09B 67/0013
See application file for complete search history.

(56) References Cited

U.S. PATENT DOCUMENTS

| | | | |
|---|---|---|---|
| 4,758,415 A | 7/1988 | Patil | |
| 6,468,340 B1 | 10/2002 | Moffatt et al. | |
| 6,538,047 B1 | 3/2003 | Miyabayashi | |
| 8,030,373 B2 * | 10/2011 | Cha ...................... | C08K 5/0041 106/31.6 |
| 8,084,516 B2 | 12/2011 | Takemura et al. | |
| 8,227,525 B2 | 7/2012 | Bisson et al. | |
| 2008/0002004 A1 | 1/2008 | O'Donnell et al. | |
| 2010/0038071 A1 | 2/2010 | Scott et al. | |
| 2011/0014439 A1 | 1/2011 | Joshi et al. | |
| 2011/0040026 A1 | 2/2011 | Lozman et al. | |
| 2011/0123716 A1* | 5/2011 | Lozman .............. | B01F 17/0028 427/288 |
| 2011/0169900 A1* | 7/2011 | Annable ............. | C09B 67/0013 347/86 |
| 2011/0175972 A1 | 7/2011 | Annable et al. | |
| 2012/0232195 A1 | 9/2012 | Mcintyre et al. | |
| 2012/0321863 A1* | 12/2012 | O'Donnell ........... | C08G 18/755 428/195.1 |
| 2013/0065030 A1 | 3/2013 | Tallant et al. | |

FOREIGN PATENT DOCUMENTS

| | | |
|---|---|---|
| EP | 2671926 A1 | 12/2013 |
| JP | 2008-150535 | 7/2008 |
| JP | 2010-138297 | 6/2010 |
| WO | 2010/010370 A1 | 1/2010 |
| WO | 2010038071 A1 | 4/2010 |
| WO | 2011/104526 A1 | 9/2011 |

OTHER PUBLICATIONS

International Preliminary Report on Patentability dated Apr. 17, 2014, issued from corresponding PCT/GB2012/052374.

* cited by examiner

*Primary Examiner* — Vu A Nguyen
(74) *Attorney, Agent, or Firm* — Banner & Witcoff, Ltd.

(57) ABSTRACT

A process for preparing a dispersion comprising the stages: i) providing a dispersion comprising a particulate solid, a liquid medium and a dispersant having cross-linkable groups and a weight averaged molecular weight of from 1,000 to 70,000; and ii) cross-linking the dispersant in the presence of the particulate solid and the liquid medium thereby preparing a dispersion of an encapsulated particulate solid, wherein the cross-linking is performed such that 0.01 to 0.5 mmoles of cross-linkable groups in the dispersant are cross-linked per g of dispersant; said process also comprising at any stage: iii) adding a metal chelating agent to the dispersion; and after stage iii) the stage of: iv) removing at least some of the metal chelating agent from the dispersion.

18 Claims, No Drawings

PROCESS FOR PREPARING A DISPERSION, DISPERSION, USE AND METHOD

RELATED APPLICATION DATA

This application is a National Stage Application under 35 U.S.C. 371 of co-pending PCT application PCT/GB2012/052374 designating the United States and filed Sep. 26, 2012; which claims the benefit of GB application number 1117187.3 and filed Oct. 6, 2011 each of which are hereby incorporated by reference in their entireties.

TECHNICAL FIELD

This invention relates to a process for preparing a dispersion, it further relates to a dispersion prepared by said process and to the use of this dispersion in thermal ink jet printing. The dispersion is useful in a wide variety of applications including inks, tints, paints, thermoplastics and thermosets. The dispersion is particularly suited to the preparation of ink jet printing inks and especially the preparation of thermal ink jet printing inks.

BACKGROUND

Ink jet printing is a non contact printing method in which tiny droplets of ink are ejected from nozzles onto a substrate. Several methods of droplet ejection exist including piezo, acoustic and thermal. Each method delivers a pressure pulse to the ink jet printing ink which results in the controlled ejection of an ink droplet towards a substrate. In thermal ink jet printing a voltage is applied to a resistor which rapidly heats up and vaporises some of the liquid vehicle in the ink jet printing ink so forming a vapour bubble. The increased pressure and expansion caused by the formation of the bubble forces a small amount of the ink to be ejected from the printer nozzle. The voltage is turned off and the vapour bubble collapses. Replacement ink is then drawn into the ink jet printer head completing the cycle. In today's thermal ink jet printers the cycle of steps for droplet ejection generally take place at high frequencies often over 1,000 times a second. A typical thermal ink jet printing nozzle should desirably fire well in excess of a million times over its lifetime.

Thermal ink jet printers should desirable fire reliably and precisely over the full lifetime of the printer head. Unfortunately, it is often the case that the print quality tends to degrade over time. Examples of print defects which can sometimes be observed include: missing pixels, missing lines and ink droplets being ejected in uncontrolled directions or in uncontrolled quantities.

It is often speculated that the heat cycling of the resistors in thermal ink jet printers is at least partly responsible for a slow degradation of components within the ink that can eventually impair the correct operation of the ink jet printer.

Dye-based inks (where the colorant is soluble in the liquid vehicle) tend to perform relatively robustly in thermal ink jet printers. In contrast, pigment-based inks (where the colorant is present as a particulate dispersion in the liquid vehicle) tend to perform significantly less well. One particular problem is that of pigment dispersion colloidal stability. Any pigment particles which aggregate or flocculate can easily foul the thermal resistor, coat the nozzles or block the ink jet printer nozzles. Pigment-based inks tend to have better properties such as light, ozone fastness and optical density when compared to dye-based inks, thus pigment-based ink suitable for thermal ink jet printing are desirable.

Accordingly, there is a need for dispersions which can be used to prepare thermal ink jet printing inks which address, at least in part, one or more of the above problems.

PRIOR ART

PCT patent publication WO2010/038071 discloses dispersions of encapsulated pigments for preparing ink jet printing inks. The printing can be thermal ink jet printing.

DETAILED DESCRIPTION OF THE INVENTION

Faced with the above problems the present inventors surprisingly found that when particulate solid dispersions were prepared in a particular way the resulting inks offered improved long term robustness and operability in thermal ink jet printers.

According to a first aspect of the present invention there is provided a process for preparing a dispersion comprising the stages:
i) providing a dispersion comprising a particulate solid, a liquid medium and a dispersant having cross-linkable groups and a weight averaged molecular weight of from 1,000 to 70,000; and
ii) cross-linking the dispersant in the presence of the particulate solid and the liquid medium thereby preparing a dispersion of an encapsulated particulate solid, wherein the cross-linking is performed such that 0.01 to 0.5 mmoles of cross-linkable groups in the dispersant are cross-linked per g of dispersant;
said process also comprising at any stage:
iii) adding a metal chelating agent to the dispersion;
and after stage iii) the stage of:
iv) removing at least some of the metal chelating agent from the dispersion.

DEFINITIONS

In this description the words "a" and "an" mean one or more unless indicated otherwise. Thus, for example, "a" particulate solid includes the possibility of there being more than one particulate solid, similarly "a" dispersant includes the possibility of there being more than one dispersant.
Particulate Solid The particulate solid may be of any kind. The particulate solid may be a dye which is insoluble in the liquid medium, more preferably the particulate solid is a pigment. The pigment may comprise and preferably is an inorganic or organic pigment material or mixture thereof. Pigments are (by definition) insoluble in the liquid medium. By insoluble we preferably mean having a solubility of no more than 1%, more preferably no more than 0.1% by weight in the liquid medium. The solubility is preferably measured at a temperature of 25° C. The solubility is preferably measured at a pH of 8. Preferably, the solubility is measured in water, more preferably deionized water (preferably adjusted to pH 8).

A preferred pigment is an organic pigment, for example any of the classes of pigments described in the Third Edition of the Colour Index (1971) and subsequent revisions of, and supplements thereto, under the chapter headed "Pigments". Examples of organic pigments are those from the azo (including disazo and condensed azo), thioindigo, indanthrone, isoindanthrone, anthanthrone, anthraquinone, isodibenzanthrone, triphendioxazine, quinacridone and phthalocyanine series, especially copper phthalocyanine and its nuclear halogenated derivative. Preferred organic pigments are phthalocyanines, especially copper phthalocyanine pigments, azo pigments, indanthrones, anthanthrones, and quinacridones.

Preferred inorganic pigments include carbon black (especially gas blacks), titanium dioxide, silicon dioxide, aluminium oxide, iron oxides and sulfides.

For ink jet especially suitable pigments are carbon blacks, C.I. Pigment Red 122, C.I. Pigment Blue 15:3 and C.I. Pigment Yellow 74. These pigments can be used to prepare the black, magenta, cyan and yellow inks for a colour ink set. Of course, there are many alternative pigments.

The pigment is preferably not surface treated so as to covalently bind water-dispersing groups onto its surface. Preferably, the pigment is not dispersible in water without the aid of a dispersant.

Dispersion

The dispersion in stage i) preferably comprises the particulate solid uniformly dispersed in the liquid medium. Preferably, the dispersion is fluid, more preferably liquid. More preferably the dispersion is liquid at a temperature of 25° C.

The dispersion may comprise particles having an average size of equal to or larger than a micron (e.g. a pre-mixture of particulate solid particles) or more preferably it may comprise particles having an average size of less than 1 micron (e.g. a comminuted dispersion).

Pre-mixtures can be formed by a number of methods including stirring, shaking, rolling and the like. These tend to be relatively low in energy and don't tend to reduce the average particle size of the particulate solid significantly.

More preferably the particles in stage i) have been comminuted. Suitable comminution methods include homogenisation, microfluidization, ultrasonication and bead milling including combinations thereof. The resulting comminuted dispersion preferably has an average particle size of from 10 to 500 nm, more preferably from 30 to 300 nm and especially from 50 to 200 nm. The particle size preferably refers to the diameter or the effective diameter in the case of non-spherical particles. More preferably the average particle size is the Z-average. Preferably, the particle size is measured by a light scattering technique. A preferred apparatus for measuring the particle size is the Malvern Zetasizer™ (especially a Zetasizer™ Nano ZS90).

Preferably, the dispersion in stage i) has been prepared by comminuting the particulate solid in the presence of the liquid medium and the dispersant.

Preferably, the dispersant is at least partially adsorbed onto the surface of the particulate solid. Preferably, the dispersant colloidally stabilises the particulate solid in the liquid medium.

In the dispersion in stage i) it is preferred that the dispersant is present at in increasing order of preferences from 1 to 150, from 5 to 100, from 10 to 90, from 15 to 80, from 15 to 70, from 15 to 60, from 20 to 50, from 20 to 45 parts by weight of dispersant per 100 parts by weight of particulate solid. It was found that these amounts of dispersant relative to particulate solid correspond to an optimal balance of colloidal stability and long term thermal ink jet printing performance.

The particulate solid in the dispersion in stage i) is preferably present at from 0.1 to 40, more preferably from 0.1 to 30 and especially from 1 to 20% by weight relative to the dispersion.

The dispersion in step i) may be itself provided in two stages:
ia) providing a dispersion comprising a particulate solid and a liquid medium;
ib) adding to the dispersion in step ia) a dispersant having cross-linkable groups and a weight averaged molecular weight of from 1,000 to 70,000;

In such a scheme it is preferred that the particulate solid is comminuted as described above once the dispersant is present.

Dispersant

Any suitable dispersant can be used. Preferred dispersants include polyesters, polycarbonates, polyurethanes, poly-amino-triazines and especially polymers obtained from the polymerisation of ethylenically unsaturated monomers. Physical combinations of these dispersants and chemical grafts of these dispersants can be used.

The weight averaged molecular weight is preferably established by gel permeation chromatography. Preferably, the molecular weight is established by reference to polystyrene standards of known molecular weight. The solvent for the gel permeation chromatography is preferably dimethyl formamide.

Preferably, the weight averaged molecular weight of the dispersant prior to cross-linking is from 5,000 to 50,000, more preferably from 5,000 to 45,000, especially from 5,000 to 40,000 and most especially from 5,000 to 30,000. We have found that these lower molecular weights correspond to better final thermal ink jet printing performance.

The cross-linkable group in the dispersant is preferably selected from oxetane, carbodiimide, siloxane, isocyanate, aziridine, amino, thiol, hydroxyl (—OH), epoxy and especially carboxylic acid and phosphonic acid groups including salts thereof.

Dispersants Obtained from Polymerising Ethylenically Unsaturated Monomers

When the dispersant is obtained from polymerising ethylenically unsaturated monomers it is preferred that the dispersant is obtained from polymerising monomers selected from styrenics, acrylamides, acrylonitriles and especially (meth)acrylates.

Preferably, at least one of the ethylenically unsaturated monomers has a cross-linkable group which is preferably selected from oxetane, carbodiimide, siloxane, isocyanate, aziridine, amino, thiol, hydroxyl (—OH), epoxy and especially carboxylic acid and phosphonic acid groups including salts thereof.

Preferably, the ethylenically unsaturated monomers comprise at least 50% by weight, more preferably at least 60% by weight and especially at least 70% by weight of benzyl (meth)acrylate relative to all the ethylenically unsaturated monomers. Benzyl methacrylate is preferred over benzyl acrylate.

Preferably, the polymeric dispersant is obtained or obtainable by copolymerising at least the components i) and ii):
i) from 70 to 95 parts of one or more (meth)acrylate monomers each having no ionic groups;
ii) from 5 to 30 parts of one or more (meth)acrylate monomers each having at least one ionic group;
wherein the sum of the parts of components i) and ii) add up to 100 and all the parts are by weight.

More preferably the polymeric dispersant is obtained or obtainable by copolymerising at least the components i) to iii):
i) from 70 to 95 parts of one or more (meth)acrylate monomers each having no ionic groups;
ii) from 5 to 30 parts of one or more (meth)acrylate monomers each having at least one ionic group;
iii) no more than 20 parts by weight of one or more ethylenically unsaturated monomers each having a polyethyleneoxy group;

wherein the sum of the parts of components i) to iii) add up to 100 and all the parts are by weight.

Preferably, polymeric dispersant comprises or consists of the repeat units from (meth)acrylate monomers.

Monomers in Component i)

Preferably, component i) comprises at least 40, more preferably at least 45 parts, even more preferably at least 50 parts, especially at least 60 parts and more especially at least 70 parts by weight of benzyl methacrylate. Preferably, component i) consists exclusively of benzyl methacrylate. We have found that increasing the amount of benzyl methacrylate provides improved ink properties such as optical density.

In cases where component i) comprises monomers other than benzyl methacrylate these are preferably $C_{1-20}$ hydrocarbyl(meth)acrylates. Preferably the $C_{1-20}$ hydrocarbyl group is an alkyl group. The alkyl group may be linear or branched. Preferred examples of which include butyl(meth)acrylate, octyl(meth)acrylate, 2-ethyl hexyl(meth)acrylate, methyl(meth)acrylate, isobornyl(meth)acrylate, lauryl(meth)acrylate and stearyl(meth)acrylate. Other suitable monomers for inclusion into component i) other than benzyl methacrylate include polypropyleneoxy(meth)acrylates which may be OH or alkyl terminated.

Preferably, component i) is present at from 70 to 92, more preferably from 70 to 90 and especially from 75 to 85 parts by weight.

Component i) may comprise one or more (meth)acrylates having one or more non-ionic cross-linkable group. Preferred examples of non-ionic cross-linkable groups include oxetane, carbodiimide, siloxane, isocyanate, aziridine and especially amino, thiol, hydroxyl and epoxy cross-linkable groups.

Monomers in Component ii)

Preferably, the ionic groups in the monomers in component ii) are anionic. Preferred examples of anionic groups include phosphorus containing acid groups (phosphonic and phosphoric acid), sulfonic acid groups and carboxylic acid groups.

Carboxylic acid and phosphonic acid groups are especially preferred as they tend to colloidally stabilise the particulate solid in the preferred aqueous liquid media and they provide ionic cross-linkable groups.

Preferably, the (meth)acrylate monomers in component ii) each have from 1 to 3, more preferably 1 or 2 and especially just one ionic group.

Preferred examples of (meth)acrylate monomers having carboxylic acid groups include itaconic acid, fumaric acid, maleic acid, crotonic acid, betacarboxy ethyl acrylate, acrylic acid and especially methacrylic acid. Preferably component ii) comprises methacrylic acid, more preferably component ii) comprises only methacrylic acid.

Preferably, component ii) is present at from 8 to 30, more preferably from 10 to 30 and especially from 12 to 25 parts by weight.

The ionic groups in the dispersant may be present in the form of the acid (protonated), in the form of the salt (e.g. metal ion salt) or a mixture thereof.

Preferably, the dispersant has ionic groups which are in the form of the salt. Preferred salts are the alkali metals (especially sodium, potassium and lithium) as well as salts with amines, organic amines and alkanolamines.

Preferably, the extent of neutralisation is at least 50 mole %, more preferably at least 70 mol % and especially at least 80 mole %. It is preferred to neutralise no more than 200 mol %, more preferably no more than 150 mol %. Preferably, the mol % value is based on the acid value of the polymeric dispersant expressed in mmoles/g. So 50 mole % of neutralising agent for a polymeric dispersant having an acid value of 2 mmoles/g is equivalent to 1 mmole/g of monobasic neutralising agent.

Monomers in Component iii)

In order of increasing preference component iii) is no more than 10 parts, 5 parts, 2 parts, 1 part, 0.5 parts and 0 parts of ethylenically unsaturated monomers each carrying a polyethyleneoxy group. By ethylenically unsaturated we preferably mean C=C. For the purposes of the present invention if a monomer could belong to components i) and iii) or ii) and iii) then it belongs to component iii). Thus an ethylenically unsaturated monomer having a polyethyleneoxy group always belongs in component iii) irrespective of other groups.

By polyethyleneoxy group we mean any group which is or comprises —$(CH_2CH_2O)_n$— wherein n is 2 or more. The end groups in the polyethyleneoxy chain may be of any kind. Thus ethylenically unsaturated monomers carrying alkyl, aryl, heterocyclyl and H terminated polyethyleneoxy groups are also limited in amount by component iii).

When any monomer is present in component iii) the ethylenically unsaturated monomers carrying a polyethyleneoxy group are preferably (meth)acrylates.

We have found that the requirement expressed in component iii) for low amounts of these kinds of monomers results in dispersions which provide improved optical density, stability and printer reliability in ink jet printers.

Optional Monomers

Optional monomers other than those in components i) to iii) may be additionally present.

Preferably, the copolymerisation composition comprises no more than 50 parts, more preferably no more than 20 parts, especially no more than 10 parts and more especially no more than 5 parts by weight of optional monomers other than those mentioned in components i) to iii).

It is especially preferred that polymer is obtained or obtainable by copolymerising a composition consisting only of the components i) to iii).

Preferably, prior to cross-linking the dispersant has an acid value of from 0.5 to 6 mmoles, more preferably from 0.5 to 4 mmoles, especially from 1 to 3 mmoles, more especially from 1 to 2.7 mmoles and most especially from 1.2 to 2.5 mmoles per g of dispersant.

Preferably all the acid groups in the dispersant are present as groups selected from carboxylic acid, phosphonic acid and sulfonic acid groups or salts thereof.

Preferred Polymeric Dispersants

In view of the above a preferred polymeric dispersant is obtained or obtainable by copolymerising the components i) to iii):

i) from 70 to 95 parts of one or more (meth)acrylate monomers each having no ionic groups comprising at least 40 parts of benzyl methacrylate;
ii) from 5 to 30 parts of methacrylic acid;
iii) no more than 5 parts, more preferably 0 parts of one or more ethylenically unsaturated monomers each carrying a polyethyleneoxy group;

wherein the sum of the parts i) to iii) add up to 100 and all the parts are by weight.

Even more preferably, the polymeric dispersant is obtained or obtainable by copolymerising at least the components i) to iii):

i) from 70 to 95 parts of benzyl methacrylate;
ii) from 5 to 30 parts of methacrylic acid;

iii) no more than 5 parts, more preferably 0 parts of one or more ethylenically unsaturated monomers each carrying a polyethyleneoxy group;

wherein the sum of the parts i) to iii) add up to 100 and all the parts are by weight.

In these polymeric dispersants it is preferred that there are no monomers other than those mentioned in components i) to iii).

Dispersant Preparation

The dispersant may be prepared by any kind of polymerisation method without particular limitation. Emulsion, bulk, suspension and especially solution polymerisation methods can be used. The initiator used in the polymerisation may be cationic, anionic or more preferably free radical. The polymerisation is preferably performed by free radical polymerisation in the presence of one or more chain transfer agents so as to limit the molecular weight as required by the present invention.

Preferred chain transfer agents include:
i) mercaptans such as butyl mercaptan, octyl mercaptan, dodecyl mercaptan, tetradecyl mercaptan, mercaptopropionic acid, butyl 3-mercatopropionate and 2-mercaptoethanol;
ii) xanthogen disulfides such as dimethylxanthogen disulfide and diisopropylxanthogen disulfide;
iii) thiuram disulfides such as tetramethylthiuram disulfide and tetrabutylthiuram disulfide;
iv) halogenated hydrocarbons such as carbon tetrachloride and ethylene bromide;
v) hydrocarbons such as pentaphenylethane; acrolein; methacrolein; allyl alcohol; 2-ethylhexyl thioglycolate;
vi) unsaturated cyclic hydrocarbons such as terpinolene, [alpha]-terpinene, [gamma]-terpinene, dipentene, [alpha]-methylstyrene dimer, 9,10-dihydroanthracene, 1,4-dihydronaphthalene, indene and 1,4-cyclohexadiene; and
vii) unsaturated heterocyclic compounds such as 2,5-dihydrofuran.

Of these the mercaptans are preferred.

Preferably, the weight ratio of all the monomers used to prepare the dispersant to all the chain transfer agents is from 5:1 to 160:1, more preferably from 5:1 to 100:1 and especially from 10:1 to 50:1.

Liquid Medium

The liquid medium preferably is or comprises water (i.e. is aqueous), accordingly the dispersion is preferably aqueous. We have found that the process according to the first aspect of the present invention works most effectively in aqueous liquid media.

The liquid medium may comprise one or more curable liquids. Examples of curable liquids include monomers which can be polymerised by means of UV or electron beam radiation. Preferably, however the liquid medium is not curable. Preferably, the liquid medium does not comprise monomers (e.g. ethylenically unsaturated monomers).

In some cases, the liquid medium comprises water and optionally one or more organic liquids which are preferably water-miscible organic liquids. Water is preferably present in the liquid medium in an amount of at least 10%, more preferably at least 30%, especially at least 40% and more especially at least 50% by weight relative to all the liquid components in the liquid medium, the remainder being one or more water-miscible organic liquids.

Preferred water-miscible organic liquids for inclusion into the liquid medium include:
i) $C_{1-6}$-alkanols, preferably methanol, ethanol, n-propanol, isopropanol, n-butanol, sec-butanol, tert-butanol, n-pentanol, cyclopentanol and cyclohexanol;
ii) linear amides, preferably dimethylformamide or dimethylacetamide;
iii) water-miscible ethers, preferably tetrahydrofuran and dioxane;
iv) diols, preferably diols having from 2 to 12 carbon atoms, for example ethylene glycol, propylene glycol, butylene glycol, pentylene glycol, hexylene glycol and thiodiglycol and oligo- and poly-alkyleneglycols, preferably diethylene glycol, triethylene glycol, polyethylene glycol, dipropylene glycol and polypropylene glycol;
v) triols, preferably glycerol and 1,2,6-hexanetriol;
vi) mono-$C_{1-4}$-alkyl ethers of diols, preferably mono-$C_{1-4}$-alkyl ethers of diols having 2 to 12 carbon atoms, especially 2-methoxyethanol, 2-(2-methoxyethoxy)ethanol, 2-(2-ethoxyethoxy)-ethanol, 2-[2-(2-methoxyethoxy)ethoxy]ethanol, 2-[2-(2-ethoxyethoxy)-ethoxy]-ethanol and ethyleneglycol monoallylether;
vii) cyclic amides, preferably 2-pyrrolidone, N-methyl-2-pyrrolidone, N-ethyl-2-pyrrolidone, caprolactam and 1,3-dimethylimidazolidone;
viii) water-miscible sulfoxides and sulfones, preferably sulfolane and dimethyl sulfoxide.

Of these water-miscible organic liquids dipropylene glycol is especially preferred.

Preferably, the liquid medium comprises water and optionally 1 or more, especially optionally from 1 to 3, water-miscible organic liquids.

Cross-Linking

Preferably, the cross-linking reaction permanently associates the dispersant molecules with each particle of the particulate solid. In essence, it is preferred that the cross-linking reaction locks the dispersant molecules in place around the particles of particulate solid such that they are substantially unable to desorb from the particulate solid surface. Preferably, the dispersant is cross-linked to form a cross-linked shell around each particle of the particulate solid. Preferably, the dispersant is not bonded to the particulate solid surface itself.

The cross-linkable groups in the dispersant may be non-ionic or more preferably ionic groups.

The cross-linking reaction is preferably cross-linking forming covalent bonds.

Suitable non-ionic cross-linkable groups in the dispersant include oxetane, carbodiimide, siloxane, isocyanate, aziridine and especially amino, thiol, hydroxyl and epoxy groups.

Preferred ionic cross-linkable groups in the dispersant include carboxylic and phosphonic acid groups including salts thereof.

In the case where the dispersant is self cross-linkable the dispersant preferably comprises co-reactive pairs of cross-linkable groups. The following possible pairs are especially suitable: one cross-linkable group is selected from amino, thiol, hydroxyl, and especially carboxylic acid (including salts thereof) and phosphonic acid (including salts thereof) groups and a second cross-linkable group selected from oxetane, carbodiimide, isocyanate, aziridine and epoxy groups.

More preferably the cross-linking is effected by means of adding a cross-linking agent. In this case the dispersant preferably has cross-linkable groups selected from amino, thiol, hydroxyl, carboxylic acid (including salts thereof) and phosphonic acid (including salts thereof) groups. Of these carboxylic acid and phosphonic acid groups including salts thereof are especially preferred.

The cross-linking agent may be an aziridine, carbodiimide, isocyanate, oxetane or more preferably an epoxide.

Especially preferred epoxides include sorbitol polyglycidyl ether, polyglycerol polyglycidyl ether, pentaerythritol polyglycidyl ether, diglycerol polyglycidyl ether, glycerol polyglycidyl ether, trimethylolpropane polyglycidyl ether, resorcinol diglycidyl ether, neopentyl glycol diglycidyl ether, 1,6-hexanediol diglycidyl ether, hydrogenated bisphenol A diglycidyl ether, ethylene glycol diglycidyl ether, diethylene glycol diglycidyl ether, polyethylene glycol diglycidyl ether, propylene glycol diglycidyl ether, dipropylene glycol diglycidyl ether, polypropylene glycol diglycidyl ether, polybutadiene diglycidyl ether.

The cross-linking agent may have two or more cross-linking groups.

Of these we have found that trimethylol propane polyglycidyl ether is especially preferred. The epoxy cross-linking agent is available as Denacol™ EX-321 from Nagase Chemtex.

An especially preferred combination is that wherein the cross-linkable groups in the dispersant are selected from carboxylic acid and phosphonic acid including salts thereof and preferably the cross-linking agent is an epoxide.

In the case where more than one cross-linkable dispersant as mentioned in stages i) is present it is preferred that all the cross-linkable dispersants present are cross-linked so as to meet the abovementioned preferences in terms of the extent of cross-linking.

It is possible that the dispersion in the present invention comprises optional non cross-linkable dispersants. It goes almost without saying that such dispersants are not cross-linked to any extent and do not feature in the calculations on the amounts of cross-linking.

Extent of Cross-Linking

The inventors have found that by controlling the extent of cross-linking to very small levels the resulting dispersions shows a balance of good colloidal stability (especially in the presence of larger amounts of water-miscible organic liquids) and good operability in thermal ink jet printers.

One preferred method for achieving the required low levels of cross-linking of from 0.01 to 0.5 mmoles of cross-linkable groups per g of dispersant is to add cross-linking agent in exactly the right molar stoichiometry required by the cross-linking reaction. As an example a dispersion in step i) which contains 4 g of dispersant which is to be cross-linked at 0.25 mmoles/g corresponds to reacting 1 mmole of cross-linkable groups. If the cross-linking agent is di-functional then only 0.5 mmoles of cross-linking agent would be required to cross-link the dispersant to the desired extent. So as a general rule the molar amount of cross-linking agent (in mmoles/g of dispersant) added is given by the Formula (1):

$$M/F \qquad (1)$$

wherein:

M is the target molar amount of cross-linking of the cross-linkable groups in the dispersant per g (which will be from 0.01 to 0.5 mmoles/g);

F is the average functionality of the cross-linking agent. (i.e. the average number of cross-linking groups per molecule of cross-linking agent). So for example a diepoxide has an average functionality of 2, whereas a triepoxide has an average functionality of 3.

Another preferred method is to prepare the dispersant such that it is self-cross-linkable and incorporates a total amount of cross-linkable groups which corresponds to the required levels when cross-linking is fully completed. Thus for example a self cross-linkable dispersant which comprises 0.1 mmoles/g of epoxy groups and 0.1 mmoles/g of carboxylic acid groups will cross-link such that 0.2 mmoles of cross-linkable groups are cross-linked per g of dispersant. A dispersant that contains 0.1 mmoles/g of epoxy groups and 2 mmoles/g of carboxylic acid groups still results in only 0.2 mmoles/g of cross-linking because here the limited amount of the epoxy groups stoichiometrically limits the extent of cross-linking.

The extent of cross-linking may be experimentally determined (and therefore an actual value) or more preferably the extent of cross-linking may be a theoretical value based on the molar amounts of cross-linkable groups present prior to cross-linking.

In the theoretical approach for determining the extent of cross-linking it is preferred that the calculation assumes 100% efficiency of the cross-linking reaction.

In order of increasing preference it is preferred that no more than 0.45, 0.4, 0.35, 0.30, 0.27, 0.25, 0.20, 0.17 and 0.15 mmoles of cross-linkable groups in the dispersant are cross-linked per g of dispersant.

In order of increasing preference it is preferred that the no less than 0.02, 0.03, 0.05 mmoles of cross-linkable groups in the dispersant are cross-linked per g of dispersant.

The cross-linking is preferably performed such that 0.01 to 0.4, more preferably from 0.02 to 0.3, especially from 0.05 to 0.3, more especially from 0.05 to 0.25, even more especially from 0.05 to 0.20 and most especially from 0.05 to 0.15 mmoles of cross-linkable groups in the dispersant are cross-linked per g of dispersant.

Preferably, the method of cross-linking is effected by adding a cross-linking agent present in a molar amount equal to that as specified above divided by F (the average functionality of the cross-linking agent as mentioned above). Thus to achieve 0.01 to 0.5 mmoles/g of cross-linking with a diepoxide requires only from 0.005 to 0.25 mmoles of diepoxide per g of dispersant.

Preferably, the cross-linking is effected by means of adding a cross-linking agent in a molar amount of from 0.01/F to 0.5/F, more preferably from 0.02/F to 0.3/F, especially from 0.05/F to 0.3/F, more especially from 0.05/F to 0.25/F, even more especially from 0.05/F to 0.20/F and most especially from 0.05/F to 0.15/F mmoles of cross-linking agent per g of dispersant, wherein F is the average number of cross-linking groups per molecule of cross-linking agent.

In some instances, for example where the structure of the cross-linking agent is not well defined (e.g. polymeric cross-linking agents) or is proprietary the average functionality of the cross-linking agent is not provided by the commercial supplier.

Thankfully, a weight per mole of cross-linking groups (WPC) is generally provided by the supplier for the cross-linking agent. So for example, for an epoxy functional cross-linking agent the weight per mole of epoxy groups (WPE) is readily available from the supplier. So for a target of 0.01 to 0.5 mmoles/g of cross-linking for 2 g of dispersant using an epoxide cross-linking agent having a WPE value of 140 requires $140 \times 2 \times 0.01 \times 10^{-3}$ g to $140 \times 2 \times 0.5 \times 10^{-3}$ g of cross-linking agent. So in general terms the amount of cross-linking agent is given by M (as defined above)×WPC, which is in g of cross-linking agent per g of dispersant.

Preferably, the cross-linking reaction is performed by heating the dispersion. The preferred temperature for the heating step is from 30 to 150° C., more preferably from 35 to 120° C., especially from 40 to 100° C. and more especially from 45 to 90° C.

The time for the cross-linking reaction is preferably from 15 minutes to 24 hours, more preferably from 30 minutes to 16 hours and especially from 1 to 10 hours.

The cross-linking reaction may be accelerated by catalysts.

Adding a Metal Chelation Agent

In stage iii) a metal chelation agent is added to the dispersion. Examples of suitable metal chelation agents include organic acids especially (amino carboxylic acids and amino phosphonic acids), oximes and thiocarbamates.

Of these amino carboxylic acids and amino phosphonic acids are preferred.

Preferred metal chelating agents include ethylenediaminetetraacetic acid (EDTA), nitrilotriacetic acid (NTA), diethylenetriaminepentaacetic acid (DTPA), ethyleneglycol-bis(2-amino-ethylether)N,N,N'N'-tetraacetic acid (EGTA), butylenediaminetetraacetic acid, (1,2-cyclohexylenedinitrilo-)tetraacetic acid (CyDTA), ethylenediaminetetrapropionic acid, (hydroxyethyl)ethylenediaminetriacetic acid (HEDTA), N,N,N',N'-ethylenediaminetetra(methylenephosphonic) acid (EDTMP), triethylenetetraminehexaacetic acid (TTHA), 1,3-diamino-2-hydroxypropane-N,N,N', N'-tetraacetic acid (DHPTA), methyliminodiacetic acid, propylenediaminetetraacetic acid, ethylenediamine-N,N'bis(o-hydroxyphenyl) acetic acid (EDDHA preferably in the o,o isomer), ethylenediamine di(o-hydroxy-p-methylphenylacetic) acid (EDDHMA), ethylenediaminedi(5-carboxy-2-hydroxyphenylacetic) acid) (EDDCHA), ethylenediaminedi(2-hydroxy-5-sulfophenylacetic) acid (EDDHSA), N,N-bis(2-hydroxybenzyl)ethylenediamine-N,N-diacetic acid (HBED), ethylenediamine-N,N'-bis-(2-hydroxyphenylglycine) (EHPG), 1,5,9-triazacyclododecane-N,N',N"-tris(methylenephosphonic acid) (DOTRP), 1,4,7,10-tetraazacyclododecane-N, N',N",N"'-tetrakis(methylenephosphonic acid) (DOTP), nitrilotris(methylene)triphosphonic acid, diethylenetriaminepenta(methylenephosphonic acid) (DETAP), aminotri(methylenephosphonic acid), 1-hydroxyethylene-1,1-diphosphonic acid, bis(hexamethylene)triamine phosphonic acid, 1,4,7-triazacyclononane-N,N',N"-tris(methylenephosphonic acid (NOTP), N-(phosphonomethyl)iminodiacetic acid (PMIDA), 2-phosphonobutane-1,2,4-tri-carboxylic acid, citric acid, tartaric acid, gluconic acid, glucoheptonate, saccharic acid, glyceric acid, oxalic acid, phthalic acid, maleic acid, mandelic acid, malonic acid, lactic acid, salicylic acid, 5-sulfosalicylic acid, catechol, gallic acid, propyl gallate, pyrogallol, 8-hydroxyquinoline, cysteine and the like. More than one metal chelating agent may be used.

Of these gluconic acid, EDTA, PMIDA, NTA, DTPA, HEDTA, EDDHA and HBED including salts thereof are preferred. Preferably, the metal chelation agent is or comprises EDTA.

The metal chelating agent may be in the form of the free acid (protonated), the salt or a mixture thereof.

Preferably, the metal chelating agent is present in the form of a salt. Preferred salts include those of ammonia and more especially group I alkaline metals (especially sodium and potassium).

Addition of the Metal Chelating Agent

Steps iii) and iv) may be performed stepwise [e.g. stage iii) followed by stage iv)] or steps iii) and iv) may be performed partially or completely simultaneously.

It is possible to perform both the stepwise addition and then the simultaneous addition (e.g. membrane washing).

In the stepwise case the metal chelating agent is added to the dispersion, the metal chelating agent and the dispersion are mixed and allowed time for the metal chelating agent to chelate any available metal impurities, then at least some of the metal chelating agent is removed in stage iv).

In the stepwise case it is preferred that the metal chelating agent and the dispersion are contacted together for a period of at least 1 minutes, more preferably at least 15 minutes and especially at least 30 minutes. Preferably, the contact time is no more than 1 week, more preferably no more than 48 hours, even more preferably no more than 10 hours, especially no more than 6 hours and more especially no more than 4 hours. The contact time is deemed to end when stage iv) begins.

In the simultaneous case the metal chelating agent is added to the dispersion and at the same time metal chelating agent is being removed from the dispersion. One way of achieving this is by cross-flow membrane filtration of the dispersion using a washing fluid which contains a metal chelating agent. In this approach it is preferred to subsequently use a second washing liquid which is free from metal chelating agent.

Preferably, the metal chelating agent is added as a solution in an aqueous liquid (especially in water).

Preferably, the metal chelating agent is added to the dispersion, with the dispersion at a pH of from 7 to 13, more preferably from 7.5 to 12 and especially from 8 to 11. This tends to work well for many metals and for dispersants which are stabilised with carboxylic acid groups.

In some cases it can be desirable that the metal chelating agent is added at a pH of from 1 to 7, more preferably from 2 to 7 and especially from 2 to 5. Examples of such cases might be where the dispersion has high levels of iron ions or where the dispersant is cationically charged or has sulfo or phospho ionic groups.

Preferably, the metal chelating agent is added to the dispersion at a temperature of from 30 to 100° C., more preferably from 40 to 90° C. and especially from 45 to 80° C. The present inventors have found that these temperatures desirably improve the rate and ease with which metal impurities can be removed.

In some cases it can be desirable that the metal chelating agent is added to the dispersion at a temperature of from 0 to 50° C., more preferably 0 to 35° C. and especially 5 to 30° C. Such cases have the advantage of being more energy efficient whilst still removing metal ions well.

Preferably, the total amount of metal chelating agent which is added to the dispersion is from 0.01 to 15%, more preferably from 0.01 to 10%, especially from 0.5 to 8% and most especially from 1 to 6% by weight relative to the weight of the particulate solid.

Preferably, the total molar amount of metal chelating agent which is added to the dispersion is from 2.0 µmoles to 0.3 mmoles, more preferably from 0.02 mmoles to 0.15 mmoles of metal chelating agent per g of particulate solid.

The inventors have found that these amounts provide good removal of metal impurities.

Preferred metals which the metal chelating agent removes include calcium, magnesium, zinc, copper, cobalt, aluminium, tin and manganese. Other metals which can be usefully removed include iron and titanium.

Removing at Least Some of the Metal Chelating Agent

The removal of at least some of the metal chelating agent may be achieved by a number of methods. In one case the particulate solid can be filtered-off and liquid medium free from metal chelating agent can be added.

In a preferred case the metal chelating agent is removed by membrane filtration, especially membrane filtration in cross-flow mode. Preferably, the dispersion is washed with a washing liquid which is free from metal chelating agent. If washing has previously been performed with a washing liquid containing a metal chelating agent it is preferred to then wash with a washing liquid which contains no metal chelating agent.

The washing liquid is preferably aqueous, more preferably the washing liquid is water. It is preferred that the water has been purified by reverse osmosis, distillation and/or deionizer resins. Preferably the washing liquid has a pH of from 5 to 8.

In some cases it is preferred to wash first with a washing liquid containing water and a base and then with water alone. Preferred bases are the alkali metal hydroxides, especially KOH and NaOH.

The volume of washing liquid used is preferably from 1 to 1000 times, more preferably from 2 to 100 times, especially from 5 to 50 times the volume of the dispersion.

The preferred membrane for membrane filtration has an average pore size of from 0.01 to 0.3 microns, more preferably from 0.05 to 0.3 microns and especially from 0.05 to 0.2 microns. Most preferred membranes have an average pore size of about 0.1 to 0.2 microns.

Preferred membranes may also be selected by their molecular weight cut-off (MWC). Preferred membranes have an MWC of from 5,000 to 200,000, more preferably from 10,000 to 100,000 and especially from 20,000 to 70,000 daltons (g/mole).

In our studies the membrane filtration stage tends to work best with a dispersion containing about 1 to 25% by weight, more preferably 2 to 20% by weight and especially from 5 to 15% by weight of the particulate solid.

After the removal stage iv) a membrane filter can be used to concentrate the dispersion. Preferably, the final dispersion contains from 5 to 25%, especially from 7 to 20% and more especially from 10 to 18% by weight of the particulate solid relative to the dispersion.

Preferably, stages iii) and iv) are such that the final dispersion contains less than 500 ppm, more preferably less than 250 ppm, even more preferably less than 100 ppm and especially less than 50 ppm by weight of total free metal selected from calcium, magnesium, zinc, copper, cobalt, aluminium, tin, manganese, titanium and iron. 1 ppm means one part by weight of metal per 1,000,000 parts by weight of the dispersion.

Order of Stages

The stages i) to iv) may be performed in many different orders. Preferred orders of the stages are i), iii), iv), ii) and more preferably i), ii), iii) and iv). It is possible to perform the process in the stages i), iii), iv), ii), iii), iv) wherein the adding and removing stages are performed after stage i) and then again after stage ii). As mentioned above the stages iii) and iv) can be performed separately, partially simultaneously and simultaneously.

In a preferred process the stages are performed in the order i), ii), iii), iv) and the stages iii) and iv) are performed separately.

As mentioned above the dispersion in stage i) may be provided in two stages ia) and ib). In this two step provision of the dispersion it is still possible that step iii) occurs at any stage. Thus step iii) can occur for example after step ia) after step ib) or after step ii). So in this scheme preferred orders of stages include:

ia), iii), iv), ib), ii);
ia), ib), iii), iv), ii);
ia), ib), ii), iii), iv);
ia), iii), iv), ib), ii), iii), iv).

Inks

The dispersions prepared by the process according to the first aspect of the present invention are especially useful for preparing inks, especially ink jet printing inks and most preferably thermal ink jet printing inks.

Preferably, the ink has a viscosity of less than 50 mPa·s, more preferably less than 30 mPa·s and especially less than 15 mPa·s, when measured at a temperature of 25° C. Preferably, the viscosity is Newtonian. A preferred apparatus for measuring the viscosity is a Brookfield DV II viscometer, preferably using spindle number 0 or 18. Preferably, the viscosity is measured at a shear rate of 100 Hz.

Preferably, the ink has a surface tension of 20 to 65 dynes/cm, more preferably 30 to 60 dynes/cm, when measured at a temperature of 25° C. Preferably, the surface tension is measured by a Kibron Aquapi Tensiometer apparatus. This is preferably a static or equilibrium surface tension.

The pH of the ink is preferably from 4 to 11, more preferably from 7 to 10.

Preferably the process for making the ink includes a step for removing particles having a particle size of more than 1 micron in diameter, for example by filtration or centrifugation. Preferably the ink has less than 10%, more preferably less than 2% and especially less than 1% by weight of particles having a size of greater than 1 micron in diameter.

Preferably, the amount of particulate solid in the ink is from 0.1 to 15%, more preferably from 1 to 10% and especially from 1 to 7% by weight.

Preferably, for inks the particulate solid is a pigment.

Preferably, the ink contains water and organic liquid in the weight ratio of 99:1 to 1:99, more preferably 99:1 to 50:50 and especially 95:5 to 70:30.

Preferred organic liquids are water-miscible organic liquids and mixtures of such liquids. Preferred water-miscible organic liquids are as hereinbefore mentioned.

Preferably, the ink comprises water and 2 or more, especially from 2 to 8, water-miscible organic liquids.

Especially preferred water-miscible organic liquids for the ink are cyclic amides, especially 2-pyrrolidone, N-methyl-pyrrolidone and N-ethyl-pyrrolidone; diols, especially 1,5-pentane diol, ethyleneglycol, thiodiglycol, diethyleneglycol and triethyleneglycol; and mono-$C_{1-4}$-alkyl and di-$C_{1-4}$-alkyl ethers of diols, more preferably mono-$C_{1-4}$-alkyl ethers of diols having 2 to 12 carbon atoms, especially 2-methoxy-2-ethoxy-2-ethoxyethanol.

Examples of further suitable ink media comprising a mixture of water and one or more organic liquids are described in U.S. Pat. No. 4,963,189, U.S. Pat. No. 4,703, 113, U.S. Pat. No. 4,626,284 and EP 425150A.

The ink may optionally contain one of more ink additives. Preferably, the ink further comprises one or more additives selected from viscosity modifiers, pH buffers, binders, metal chelating agents, surfactants, corrosion inhibitors, biocides, dyes and/or kogation reducing additives. Preferably, the process according to the first aspect of the present invention additionally comprises adding one or more of these additives.

Preferably, an ink jet printing ink (especially a thermal ink jet printing ink) is prepared by a process which comprises the process according to the first aspect of the present invention.

Product by Process

According to a second aspect of the present invention there is provided a dispersion obtained or obtainable by a process according to the first aspect of the present invention.

Preferably, the dispersion according to the second aspect of the present invention contains less than 500 ppm, more preferably less than 250 ppm, even more preferably less than 100 ppm and especially less than 50 ppm by weight of total free metal selected from calcium, magnesium, zinc, copper, cobalt, aluminium, tin, manganese, titanium and iron. 1 ppm means one part by weight of metal per 1,000,000 parts by weight of the dispersion. By the word free we mean any metal which is part of the particulate solid itself is not included. Thus by example the copper in copper phthalocyanine itself is not counted as free metal. Accordingly, free metal is separate from the particulate solid itself.

The free metal may be in the form of simple salts, complexes or in the form of finely dispersed particles such as metal oxides.

To measure the amounts of free metal it is preferable to separate the encapsulated particulate solid from the dispersion. This can be done by ultrafiltration, coagulation or especially by centrifugation. The metal content of the supernatant can then be established by techniques such as elemental analysis. A preferred form of elemental analysis is inductively coupled plasma-optical emission spectrometer (ICP-OES). A preferred ICP-OES device for determining the free metal ions is a Perkin Elmer 3300DV.

Uses

The dispersions according to the second aspect of the present invention are especially useful for printing from thermal ink jet printers onto a substrate.

Methods

The dispersions according to the second aspect of the present invention are especially suitable for a method of thermal ink jet printing onto a substrate.

EXAMPLES

The invention is further illustrated by the following Examples in which all parts and percentages are by weight unless otherwise stated.

Such that the Experiments described below may be scaled as is required the amounts have been expressed in parts. The actual experiments were performed wherein all parts were grams.

1.1 Preparation of Dispersant Solution (1)

A monomer feed composition was prepared by mixing benzyl methacrylate (785 parts), methacrylic acid (215 parts), butyl 3-mercatopropionate (75 parts) and dipropylene glycol (385 parts).

An initiator feed composition was prepared by mixing tert-butyl peroxy-2-ethylhexanoate (17.72 parts) and dipropylene glycol (510 parts).

Dipropylene glycol (635 parts) was heated to 85° C. in a reactor vessel, continuously stirred and purged with a nitrogen gas atmosphere. The monomer feed and the initiator feed compositions were slowly fed into the reactor vessel whilst stirring the contents, maintaining the temperature at 85° C. and maintaining the nitrogen atmosphere. The monomer feed was fed into the reactor over 4 hours, whilst the initiator feed was fed in over 5 hours. The reactor vessel contents were maintained at 85° C. for a further 2 hours before cooling to 25° C. The final solids content was 40%. This was designated as Dispersant Solution (1).

Dispersant (1) was an acrylic copolymer which had a number average molecular weight of 12,500, a weight average molecular weight of 16,500 and a polydispersity of 1.32 as measured by GPC using the preferred method. Dispersant (1) had an acid value corresponding to 2.5 mmoles of acid groups/g of dispersant. Dispersant (1) contained the repeat units from benzyl methacrylate and methacrylic acid in the proportions 78.5:21.5 by weight respectively.

1.2 Preparation of Comparative Dispersant Solution (1)

A monomer feed composition was prepared by mixing benzyl methacrylate (785 parts), methacrylic acid (215 parts), butyl 3-mercatopropionate (5.97 parts) and dipropylene glycol (770 parts).

An initiator feed composition was prepared by mixing tert-butyl peroxy-2-ethylhexanoate (17.60 parts) and dipropylene glycol (380 parts).

Dipropylene glycol (380 parts) was heated to 80° C. in a reactor vessel, continuously stirred and purged with a nitrogen gas atmosphere. The monomer feed and the initiator feed compositions were slowly fed into the reactor vessel whilst stirring the contents, maintaining the temperature at 80° C. and maintaining the nitrogen atmosphere. The monomer feed and the initiator feed were both fed into the reactor over 4 hours. The reactor vessel contents were maintained at 80° C. for a further 6 hours before cooling to 25° C. The final solids content was 40%. This was designated as Comparative Dispersant Solution (1).

Comparative Dispersant (1) was an acrylic copolymer which had a number average molecular weight of 51,154, a weight average molecular weight of 86,797 and a polydispersity of 1.7 as measured by GPC. Comparative Dispersant (1) had an acid value corresponding to 2.5 mmoles of acid groups/g of dispersant. Comparative Dispersant (1) contained the repeat units from benzyl methacrylate and methacrylic acid in the proportions 78.5:21.5 by weight respectively. Comparative Dispersant (1) differs in that the weight averaged molecular weight is too high for the requirements for the present invention.

2.1 Dispersant Aqueous Solution (1)

Dispersant Solution (1) as prepared in 1.1 (100 parts) was neutralised with potassium hydroxide aqueous solution to give an aqueous solution having a pH of about 9. This resulted in Dispersant Aqueous Solution (1) which contained approximately 20% by weight of Dispersant (1).

2.2 Comparative Dispersant Aqueous Solution (1)

Comparative Dispersant Solution (1) as prepared in 1.2 (100 parts) was neutralised with potassium hydroxide aqueous solution to give an aqueous solution having a pH of about 9. This resulted in Comparative Dispersant Aqueous Solution (1) which contained approximately 31.1% by weight of Comparative Dispersant (1).

3. Preparation of Mill-Bases by Comminution 3.1 Cyan Mill-Base (1)

Pigment powder (200 parts of TRB-2, ex Dainichiseika C.I. Pigment Blue 15:3), Dispersant Aqueous Solution (1) as prepared in 2.1 (300 parts) and water (500 parts) were mixed together to form a premixture.

The premixture was thoroughly mixed together using a planetary mixer for 1 hour followed by a Silverson™ mixer for a further 2 hours. After mixing the mixture was transferred to a horizontal bead mill containing 0.8 mm beads. The mixture was then comminuted (milled) for 8 hours.

The milling beads were then separated from the milled mixture. This resulted in Cyan Mill-base (1).

The pigment particles in the resulting mill-base had a Z-Average particle size of 107 nm. The Z-Average particle size was established for all dispersions using a Zetasizer™ 3000 obtained from Malvern.

3.2 Comparative Cyan Mill-base (1)

Pigment powder (213 parts of TRB-2, ex Dainichiseika), Comparative Dispersant Aqueous Solution (1) as prepared in 2.2 (205 parts) and water (582 parts) were mixed together to form a premixture.

The premixture was thoroughly mixed together using a Triple Shaft Mixer for 7 hours. After mixing the mixture was transferred to a horizontal bead mill containing 0.8 mm beads. The mixture was then comminuted (milled) for 22 hours.

The milling beads were then separated from the milled mixture. This resulted in Comparative Cyan Mill-base (1). The pigment particles in the resulting mill-base had a Z-Average particle size of 124 nm.

4. Cross-Linking the Dispersant to Prepare the Encapsulated Particulate Solid

4.1 Cross-Linking of the Dispersant

All the mill-bases prepared above in points 3.1 to 3.2 were adjusted to a pigment content between 5% and 15% by weight relative to the dispersion by the addition of water.

The dispersants in each of the mill-bases were then cross-linked using trimethylolpropane polyglycidyl ether (Denacol EX321™ obtained from Nagase ChemteX, with weight per epoxy=140, hereafter abbreviated as EX-321) as the cross-linking agent. This cross-linked some of the carboxylic acid groups in the dispersant and thereby encapsulated the pigment particles. The cross-linking reaction was performed in the presence of boric acid (obtained from Aldrich). In each case a mixture was prepared containing the amounts of the components as specified in Table 1. The cross-linking reaction was effected by heating the above described mixture to a temperature of about 65° C. for 5 hours. This prepared a range of different Encapsulated pigment dispersions with the references as indicated in column 1 of Table 1. The extent of cross-linking was controlled by using specific amounts of the epoxy cross-linking agent.

TABLE 1

Encapsulated pigment dispersions

| Encapsulated Pigment Dispersion reference | Mill-base used | Mill-base pigment content (%) | Mill-base (parts) | Cross-linker (parts) | Boric acid (parts) |
|---|---|---|---|---|---|
| Encapsulated Cyan Dispersion (1) | Cyan Mill-base (1) | 7.8 | 800 | EX-321 (0.31) | 0.145 |
| Encapsulated Cyan Dispersion (2) | Cyan Mill-base (1) | 7.8 | 842 | EX-321 (0.69) | 0.304 |
| Comparative Encapsulated Cyan Dispersion (1) | Cyan Mill-base (1) | 7.8 | 1000 | EX-321 (3.28) | 1.446 |
| Comparative Encapsulated Cyan Dispersion (2) | Comparative Cyan Mill-base (1) | 13.1 | 600 | EX-321 (0.83) | 0.364 |
| Comparative Encapsulated Cyan Dispersion (3) | Comparative Cyan Mill-base (1) | 10 | 1000 | EX-321 (4.2) | 1.854 |

5. Adding Metal Chelating Agent to the Dispersions

The Encapsulated pigment dispersions prepared above in 4.1 were in some cases treated with either tetrasodium EDTA or tetrasodium N-(phosphonomethyl)iminodiacetic acid (PMIDA) as a metal chelating agent. After completion of the cross-linking step, a 10 wt % aqueous solution of the chelating agent was added to the Encapsulated Pigment Dispersions and Comparative Encapsulated Pigment Dispersions at a temperature of about 65° C. and left for 1 hour before cooling down to 25° C. The amount of chelating agent added was 4 wt % relative to the pigment content in the dispersions.

6. Removing at Least Some of the Metal Chelating Agent

The Encapsulated pigment dispersions prepared above in 5 were, in many cases, purified using a membrane having a molecular weight cut off of 50 kD or an average pore size of 0.1 microns. The membrane purification was carried out in a cross-flow mode. The Encapsulated pigment dispersions were diafiltered with approximately 10 wash volumes of pure deionised water per 1 volume of the Encapsulated pigment dispersion. The membrane was then used to concentrate the encapsulated dispersion back to a solids content of around 10 to 15% by weight.

This prepared a range of different Final Encapsulated pigment dispersions with varying levels of cross-linking and subjected to differing degrees of purification as indicated in Table 2.

TABLE 2

Final Encapsulated Pigment Dispersions

| Final encapsulated pigment dispersion reference | Encapsulated pigment dispersion used | Chelating agent (wt % on pigment) | membrane used | Extent of crosslinking (mmol/g) |
|---|---|---|---|---|
| Final Encapsulated Cyan Dispersion (1) | Encapsulated Cyan Dispersion (1) | Sodium EDTA (4%) | 50 kD | 0.12 |
| Final Encapsulated Cyan Dispersion (2) | Encapsulated Cyan Dispersion (2) | Sodium EDTA (4%) | 50 kD | 0.25 |
| Final Encapsulated Cyan Dispersion (3) | Encapsulated Cyan Dispersion (1) | Sodium PMIDA (4%) | 50 kD | 0.12 |
| Comparative Final Encapsulated Cyan Dispersion (1) | Comparative Encapsulated Cyan Dispersion (1) | Sodium EDTA (4%) | 50 kD | 1.0 |
| Comparative Final Encapsulated Cyan Dispersion (2) | Comparative Encapsulated Cyan Dispersion (2) | Sodium EDTA (4%) | 50 kD | 0.25 |
| Comparative Final Encapsulated Cyan Dispersion (3) | Comparative Encapsulated Cyan Dispersion (3) | Sodium EDTA (4%) | 0.1 micron | 1.0 |

TABLE 2-continued

Final Encapsulated Pigment Dispersions

| Final encapsulated pigment dispersion reference | Encapsulated pigment dispersion used | Chelating agent (wt % on pigment) | membrane used | Extent of crosslinking (mmol/g) |
|---|---|---|---|---|
| Comparative Final Encapsulated Cyan Dispersion (4) | Encapsulated Cyan Dispersion (1) | None | 50 kD | 0.12 |
| Comparative Final Encapsulated Cyan Dispersion (5) | Encapsulated Cyan Dispersion (1) | None | None | 0.12 |

7. Preparation of Inks and Comparative Inks

Each of the above Final Encapsulated pigment dispersions were used to prepare an Ink or Comparative ink having the following composition.

| Ink Vehicle | |
|---|---|
| Encapsulated Pigment | 2.5 parts* |
| 2-Pyrrolidone | 2.83 parts |
| Glycerol | 9.44 parts |
| 1,2 Hexane diol | 3.78 parts |
| Surfynol ™ 465 | 0.95 parts |
| Pure water | sufficient to make 100 parts |

Surfynol$^{RTM}$ 465 is a surfactant available from Air Products.

*2.5 parts of Encapsulated pigment 2.5 parts by weight of the pigment were used to prepare the ink. Thus if the Final encapsulated pigment dispersion contains 10% by weight of pigment on the total dispersion then 25 parts by weight would be used in the formulation of the ink.

Using this ink formulation the following inks were prepared:

TABLE 3

| Ink | Encapsulated Pigment Dispersion |
|---|---|
| Cyan Ink (1) | Final Encapsulated Cyan Dispersion (1) |
| Cyan Ink (2) | Final Encapsulated Cyan Dispersion (2) |
| Cyan Ink (3) | Final Encapsulated Cyan Dispersion (3) |
| Comparative Cyan Ink (1) | Comparative Final Encapsulated Cyan Dispersion (1) |

TABLE 3-continued

| Ink | Encapsulated Pigment Dispersion |
|---|---|
| Comparative Cyan Ink (2) | Comparative Final Encapsulated Cyan Dispersion (2) |
| Comparative Cyan Ink (3) | Comparative Final Encapsulated Cyan Dispersion (3) |
| Comparative Cyan Ink (4) | Comparative Final Encapsulated Cyan Dispersion (4) |
| Comparative Cyan Ink (5) | Comparative Final Encapsulated Cyan Dispersion (5) |

8. Assessment of Thermal Inkjet Printhead Operability

The inks prepared in point 7 were charged to an empty cartridge of a Canon MX7600 thermal inkjet printer. Using a standard test pattern, up to 100 pages were printed on plain paper with each ink, and the print quality was assessed visually according to the following scale:

A: 100 pages could be printed without any deterioration in print quality
B: 100 pages could be printed, but print quality deteriorated during the test
C: Less than 100 pages could be printed with the ink The results of the tests were as shown in Table 4

TABLE 4

| Ink | Extent of crosslinking (mmol/g) | Dispersant (Mw) | Metal chelating agent (amount) | membrane used | Thermal Inkjet Operability |
|---|---|---|---|---|---|
| Cyan Ink (1) | 0.12 | 16,500 | Sodium EDTA (4%) | 50 kD | A |
| Cyan Ink (2) | 0.25 | 16,500 | Sodium EDTA (4%) | 50 kD | B |
| Cyan Ink (3) | 0.12 | 16,500 | Sodium PMIDA (4%) | 50 kD | A |
| Comparative Cyan Ink (1) | 1.0 | 16,500 | Sodium EDTA (4%) | 50 kD | C |
| Comparative Cyan Ink (2) | 0.25 | 86,797 | Sodium EDTA (4%) | 50 kD | C |
| Comparative Cyan Ink (3) | 1.0 | 86,797 | Sodium EDTA (4%) | 0.1 micron | C |
| Comparative Cyan Ink (4) | 0.12 | 16,500 | None | 50 kD | B |
| Comparative Cyan Ink (5) | 0.12 | 16,500 | None | None | B |

From Table 4, it can readily be seen that the dispersions prepared by the process according to the present invention can be used to prepare ink jet printing inks which provide improved operability in a thermal inkjet printers. It can also be seen that when any of the requirements of the present invention are not met this results in notable deterioration of the thermal ink jet printing performance.

We have obtained similarly advantageous results with many different variations within the scope of the present invention.

For example good results have also been obtained with:
i) alternative particulate solids such as C.I. Pigment Red 122, C.I. Pigment Yellow 74 and Carbon Black;
ii) dispersants having alternative weight average molecular weights such as 32,000 and 39,000;
iii) dispersants having alternative acid values such as 1.5 mmoles/g of acid groups;
iv) dispersants used in different weight proportions relative to the particulate solid (e.g. 40 and 50% of dispersant relative to the weight of particulate solid);
v) different cross-linking agents including polyethylene glycol diglycidyl ether, polypropylene glycol diglycidyl ether and polyglycerol polyglycidyl ether;
vi) different amounts of cross-linking including sufficient cross-linking agent to cross-link 0.5 mmoles/g of cross-linkable groups in the dispersant;
vii) different amounts of metal chelating agent including 1 wt % relate to the weight of the particulate solid;
viii) different wash volumes used in the purification step including 3× and 6× the volume of the dispersion;

In totality all of these variations still result in dispersions which could be formulated into inks providing a thermal ink jet operability as ranked in section 8 above as an "A" or "B" rating. Accordingly, the present invention is very versatile and broadly applicable.

9. Further Inks

The further inks described in Tables I and II may be prepared wherein FECD 1 is Final Encapsulated Cyan Dispersion (1) and FECD 2 is Final Encapsulated Cyan Dispersion (2) as prepared in step 6 above. The references to the ink additives are as defined below. Numbers quoted in the second column onwards refer to the number of parts of the relevant ingredient and all parts are by weight. The inks may be applied to paper by piezo, Memjet and especially thermal ink jet printing.

The following abbreviations are used in Tables I and II:
PG=propylene glycol
DEG=diethylene glycol
NMP=N-methyl pyrrolidone
DMK=dimethylketone
IPA=isopropanol
MEOH=methanol
2P=2-pyrrolidone
MIBK=methylisobutyl ketone
P12=propane-1,2-diol
BDL=butane-2,3-diol
Surf=Surfynol™ 465 from Air Products
PHO=Na$_2$HPO$_4$ and
TBT=tertiary butanol
TDG=thiodiglycol
GLY=Glycerol
nBDPG=mono-n-butyl ether of dipropylene glycol
nBDEG=mono-n-butyl ether of diethylene glycol
nBTEG=mono-n-butyl ether of triethylene glycol

TABLE I

| FECD | FECD Content | Water | PG | DEG | NMP | DMK | NaOH | Na Stearate | IPA | MEOH | 2P | MIBK | GLY | nBDPG |
|---|---|---|---|---|---|---|---|---|---|---|---|---|---|---|
| 1 | 30 | 50 | 5 | | 6 | 3 | | | | | 5 | | 1 | |
| 1 | 30 | 59.8 | | 5 | 5 | | 0.2 | | | | | | | |
| 1 | 40 | 45 | 3 | | 3 | 3 | | | | 5 | 1 | | | |
| 1 | 40 | 51 | | 8 | | | | | | | | 1 | | |
| 1 | 40 | 45.8 | 5 | | | | | 0.2 | 4 | | | 5 | | |
| 1 | 40 | 41 | | | 9 | | 0.5 | 0.5 | | | 9 | | | |
| 1 | 40 | 10 | 4 | 15 | 3 | 3 | | | 6 | 10 | 5 | 4 | | |
| 1 | 40 | 30 | | 20 | | | | | 9 | | | | | 1 |
| 1 | 50 | 25 | 5 | 4 | | 5 | | | | 6 | | 5 | | |
| 1 | 50 | 29.7 | 3 | 5 | 2 | 10 | | 0.3 | | | | | | |
| 2 | 50 | 15 | | 5 | 4 | 6 | | | 5 | 4 | 6 | 5 | | |
| 2 | 50 | 46 | | | | | | | | 4 | | | | |
| 2 | 40 | 50 | 5 | | | | | | 5 | | | | | |
| 2 | 40 | 40 | 2 | 6 | 2 | 5 | | | 1 | | | 4 | | |
| 2 | 40 | 40 | | 5 | | | | | | | 15 | 5 | | |
| 2 | 40 | 44 | | | 11 | | | | | | 5 | | | |
| 2 | 50 | 30 | 2 | | | 10 | | | | 2 | | 6 | | |
| 2 | 50 | 39.7 | | | | 7 | 0.3 | | 3 | | | | | |
| 2 | 40 | 29 | 2 | 20 | 2 | 1 | | | | | 3 | 3 | | |
| 2 | 40 | 51 | | | 4 | | | | | | 5 | | | |
| 2 | 40 | 40 | | | | | | | | | | | 20 | |
| 2 | 40 | 40 | | | | | | | | | | | | 20 |

TABLE II

| FECD | FECD content | Water | PG | DEG | NMP | Surf | TBT | TDG | BDL | PHO | 2P | PI2 | nBDEG | nBTEG |
|---|---|---|---|---|---|---|---|---|---|---|---|---|---|---|
| 1 | 30 | 49.8 | 15 | | | 0.2 | | | | | 5 | | | |
| 1 | 30 | 58.8 | | 5 | | | | | | 1.2 | 5 | | | |
| 1 | 40 | 44.6 | 5 | 5 | | 0.1 | 4 | 0.2 | | | | | | 1 |
| 1 | 40 | 5 | | 6 | 4 | 5 | | | | 0.12 | | | | |
| 1 | 40 | 49.8 | 4 | 8 | | | | | | | | | 6 | |
| 1 | 40 | 8 | | 10 | | 0.3 | | | 5 | 0.2 | | | | |
| 1 | 50 | 41.7 | 5 | 5 | | | | 0.3 | | | | | | |
| 1 | 50 | 44.8 | 10 | 4 | | | | | 1 | | | 4 | 11 | |

TABLE II-continued

| FECD | FECD content | Water | PG | DEG | NMP | Surf | TBT | TDG | BDL | PHO | 2P | PI2 | nBDEG | nBTEG |
|---|---|---|---|---|---|---|---|---|---|---|---|---|---|---|
| 1 | 40 | 39.7 | 4 | 10 | 3 | | | | | 2 | 6 | | | |
| 1 | 40 | 20 | | | 6 | | | | | | 3 | | | |
| 2 | 40 | 35 | | 9 | 7 | 2 | | | | 0.95 | 5 | | 1 | |
| 2 | 40 | 51 | 5 | 11 | | | | | | | 6 | | | |
| 2 | 50 | 35.0 | | | 7 | | | | | | 7 | | | |
| 2 | 50 | 5 | 5 | 5 | 4.1 | | 0.2 | 0.1 | 5 | 0.1 | 5 | | | |
| 2 | 40 | 38 | | 10 | | 1 | | | | | | | | |
| 2 | 40 | 36 | | | | | | 10 | | | | | | |
| 2 | 30 | 24.5 | | | 5 | | | 12 | | | 5 | | | |
| 2 | 30 | 50 | 2 | | 8 | | | 15 | | | 5 | | | |
| 2 | 40 | 50 | | | | | | | 8 | | 12 | | | |
| 2 | 40 | 48 | | 10 | | | | | | | | | 10 | |
| 2 | 40 | 40 | | | | | | | | | 10 | | | 10 |

The invention claimed is:

1. A process for preparing a dispersion comprising the stages:
   i) providing a dispersion comprising a particulate solid, a liquid medium and a dispersant having cross-linkable groups and a weight averaged molecular weight of from 1,000 to 70,000; and
   ii) cross-linking the dispersant in the presence of the particulate solid and the liquid medium thereby preparing a dispersion of an encapsulated particulate solid, wherein the cross-linking is performed such that 0.01 to 0.5 mmoles of cross-linkable groups in the dispersant are cross-linked per gram of dispersant;
said process also comprising at any stage:
   iii) adding a metal chelating agent to the dispersion;
and after stage iii) the stage of:
   iv) removing at least some of the metal chelating agent from the dispersion.

2. The process according to claim 1 wherein the stages are performed in the order i), iii), iv), ii) or i), ii), iii), iv).

3. The process according to claim 1 wherein stage i) comprises the stages:
   ia) providing a dispersion comprising a particulate solid and a liquid medium;
   ib) adding to the dispersion in step ia) a dispersant having cross-linkable groups and a weight averaged molecular weight of from 1,000 to 70,000.

4. The process according to claim 3 wherein the stages are performed in the orders;
   ia), iii), iv), ib), ii); or
   ia), ib), iii), iv), ii); or
   ia), ib), ii), iii), iv); or
   ia), iii), iv), ib), ii), iii), iv).

5. The process according to claim 1 wherein the cross-linking is effected by means of adding a cross-linking agent in a molar amount of from 0.01/F to 0.5/F mmoles of cross-linking agent per gram of dispersant, wherein F is the average number of cross-linking groups per molecule of cross-linking agent.

6. The process according to claim 1 wherein the cross-linkable groups in the dispersant are selected from carboxylic and phosphonic acid groups including salts thereof.

7. The process according to claim 1 wherein prior to cross-linking the dispersant has an acid value of from 0.5 to 4mmoles per gram of dispersant and wherein the dispersant is present at from 15 to 60 parts by weight per 100 parts by weight of the particulate solid.

8. The process according to claim 1 wherein the total amount of metal chelating agent added in stage iii) is of from 0.01% to 10% by weight relative to the weight of the particulate solid.

9. The process according to claim 1 wherein stage iv) is performed by membrane filtration.

10. The process according to claim 9 wherein a washing liquid is used in an amount of from 2 to 100 times the volume of the dispersion.

11. The process according to claim 1 wherein the dispersant is prepared by polymerising ethylenically unsaturated monomers comprising at least 50% by weight of benzyl (meth) acrylate.

12. The process according to claim 1 wherein the particulate solid is a pigment.

13. The process according to claim 1 further comprising processing the dispersion into an ink jet printing ink.

14. The process according to claim 1 wherein:
   (a) the cross-linking is effected by means of adding a cross-linking agent in a molar amount of :from 0.01/F to 0.5/F mmoles of cross-linking agent per gram of dispersant, wherein F is the average number of cross-linking groups per molecule of cross-linking agent;
   (b) the cross-linkable groups in the dispersant are selected from carboxylic and phosphonic acid groups including salts thereof;
   (c) prior to cross-linking the dispersant has an acid value of from 0.5 to 4mmoles per gram of dispersant and wherein the dispersant is present at from 15 to 60 parts by weight per 100 parts by weight of the particulate solid; and
   (d) the total amount of metal chelating agent added in stage iii) is of from 0.01% to 10% by weight relative to the weight of the particulate solid.

15. The process according to claim 1 wherein:
stage i) comprises the stages:
   ia) providing a dispersion comprising a particulate solid and a liquid medium;
   ib) adding to the dispersion in step ia) a dispersant having cross-linkable groups and a weight averaged molecular weight of from 1,000 to 70,000;
and wherein the stages are performed in the order:
   ia), iii), iv), ib), ii); or
   ia), ib), iii), iv), ii); or
   ia), ib), ii), iii), iv); or
   ia), iii), iv), ib), ii), iii), iv);
and wherein:
   (a) the cross-linking is effected by means of adding a cross-linking agent in a molar amount of from 0.01/F to 0.5/F mmoles of cross-linking agent per gram of dispersant, wherein F is the average number of cross-linking groups per molecule of cross-linking agent;

(b) the cross-linkable groups in the dispersant are selected from carboxylic and phosphonic acid groups including salts thereof;
(c) prior to cross-linking the dispersant has an acid value of from 0.5 to 4mmoles per gram of dispersant and wherein the dispersant is present at from 15 to 60 parts by weight per 100 parts by weight of the particulate solid; and
(d) the total amount of metal chelating agent added in stage iii) is of from 0.01% to 10% by weight relative to the weight of the particulate solid.

16. The process according to claim 14 wherein stage iv) is performed by membrane filtration.

17. The process according to claim 14 wherein the dispersant is prepared by polymerising ethylenically unsaturated monomers comprising at least 50% by weight of benzyl (meth) acrylate.

18. The process according to claim 14 wherein the particulate solid is a pigment.

* * * * *